(12) United States Patent
Breen

(10) Patent No.: US 8,349,919 B2
(45) Date of Patent: Jan. 8, 2013

(54) REINFORCED EROSION CONTROL MATRIX AND ITS APPLICATION

(75) Inventor: John T. Breen, Houston, TX (US)

(73) Assignee: United States Gypsum Company, Chicago, IL (US)

( * ) Notice: Subject to any disclaimer, the term of this patent is extended or adjusted under 35 U.S.C. 154(b) by 26 days.

(21) Appl. No.: 12/846,435

(22) Filed: Jul. 29, 2010

(65) Prior Publication Data

US 2011/0024514 A1    Feb. 3, 2011

Related U.S. Application Data

(60) Provisional application No. 61/229,950, filed on Jul. 30, 2009.

(51) Int. Cl.
*B29C 47/00* (2006.01)
*A01G 25/09* (2006.01)

(52) U.S. Cl. .............................. 524/13; 239/1

(58) Field of Classification Search .............. 524/13
See application file for complete search history.

(56) References Cited

U.S. PATENT DOCUMENTS

| | | | |
|---|---|---|---|
| 2,625,529 A | 1/1953 | Hendrick et al. | |
| 3,600,852 A | 8/1971 | Burke et al. | |
| 4,047,962 A * | 9/1977 | Copeland | 106/674 |
| 4,465,518 A | 8/1984 | Miyoshi et al. | |
| 5,161,915 A | 11/1992 | Hansen | |
| 5,275,508 A | 1/1994 | Hansen | |
| 5,385,429 A | 1/1995 | Hansen | |
| 5,399,048 A | 3/1995 | Walker | |
| 5,525,009 A | 6/1996 | Hansen | |
| 5,897,946 A | 4/1999 | Nachtman et al. | |
| 6,096,373 A | 8/2000 | Nachtman et al. | |
| 6,435,770 B1 | 8/2002 | Shi | |
| 6,669,752 B2 | 12/2003 | Arnold et al. | |
| 7,256,227 B2 | 8/2007 | Stone | |
| 7,284,930 B2 * | 10/2007 | Shi et al. | 405/129.1 |
| 7,288,581 B2 * | 10/2007 | Ferrall et al. | 524/5 |
| 2005/0220542 A1 * | 10/2005 | Marsh et al. | 405/129.9 |
| 2006/0205597 A1 | 9/2006 | Fujimori et al. | |
| 2008/0152945 A1 * | 6/2008 | Miller et al. | 428/688 |
| 2009/0028650 A1 * | 1/2009 | Delamore | 405/302.6 |
| 2009/0226261 A1 | 9/2009 | Hansen et al. | |

OTHER PUBLICATIONS

Tufstone, Product data sheet of TUF STONE, United States Gypsum Company, 1999.*

* cited by examiner

*Primary Examiner* — Hui Chin
(74) *Attorney, Agent, or Firm* — Greer, Burns & Crain, Ltd.; Pradip Sahu; Philip T. Petti

(57) ABSTRACT

A dry mixture for use with water has been developed to be used as an erosion control spray matrix for reducing erosion of sandy soils while awaiting development of a root system of plants to hold the soil in place. The dry erosion control mixture includes alpha-calcined calcium sulfate hemihydrate, a non-gypsum binder polymer; biodegradable fibers; and wood fiber mulch. An erosion control slurry is applied to an area of soil in need of erosion-control. After obtaining the dry erosion control mixture, it is mixed with water to form erosion control slurry. The ratio of the composition to the water is preferably from about 1:8 to about 1:12. Seed is distributed over the soil and the erosion control slurry is applied over the distributed seed.

16 Claims, No Drawings

REINFORCED EROSION CONTROL MATRIX AND ITS APPLICATION

CROSS-REFERENCE TO RELATED APPLICATION

This application is a continuation-in-part of U.S. Provisional Ser. No. 61/229,950, filed Jul. 30, 2009 and herein incorporated by reference.

FIELD OF THE INVENTION

The present invention generally relates to an erosion-control matrix. More specifically, it relates to a spray-applied, erosion-control matrix that is effective in all most types and also imparts nutrients to the soil.

BACKGROUND

Soil erosion is very costly. It has been estimated that in the U.S., wind and water erosion causes $17 billion in on-site damages through lost soil and nutrients. It is estimated that off-site damages from siltation, drainage, flooding and undermining of existing structures costs the U.S. $27 billion dollars each year. The erosion control industry has grown rapidly to meet these demands. Highway and street construction is a good indicator for demand of erosion control services. In 2008, the value of construction manufacturing rose 52% from 2007, compared to the private sector construction trend that was down 10% in the first period.

The presence of plant life reduces erosion by slowing run-off of water, allowing it to be absorbed into the soil. Plant root systems further stabilize the soil by trapping soil between the roots, preventing it from being carried away with flowing water. Erosion control is an environmental consideration any place where erosion occurs. It is common in construction areas where new slope embankments and channels are created. When vegetation has been removed to prepare for construction or new drainage systems, water tends to run off the land rather than be absorbed by it. Much of the soil can be carried away with the run-off, especially where the soil is primarily sand. When the topsoil has washed away, it is more difficult for seeds to germinate and become established in poorly structured soil.

It is known to add a layer of straw or wood chips to hold new seed in place and thereby help control erosion. Although the weight of the straw and wood assist in holding down the seed, heavy rain or run-off can carry them away, particularly on steep slopes. One reason this occurs is because the straw and wood are loose on the slope, and they can become dislodged and entrained in the water flow. Heavy run-off also washes away the straw and wood products, eventually leaving no protection at all. Even if they stay in place when organic materials degrade, such as wheat straw, they absorb nitrogen and other plant nutrients from the soil. Fertility of the soil is thereby reduced, inhibiting germination and growth of plants, especially the roots. This delays forming a root system to trap the soil, holding it in place after the organic mat biodegrades.

To hold the seed in place, erosion-control matrices have been developed that are surface-applied to the soil and are unlikely to wash away. Two types of erosion-control matrices are commonly used, a rolled-out matrix and a spray matrix. The rolled-out matrix is brought to the job site as a ready-to-use blanket. It is unrolled and stapled to the soil. Unrolling the blanket, assuring overlap with adjoining sections of blanket and affixing it to the soil is a labor-intensive process that can be very expensive. A spray matrix is formed in situ by spraying a liquid or slurry onto the soil that sets, hardens or dries to cover seed that has been distributed.

Gypsum is also known as calcium sulfate dihydrate, terra alba or landplaster. Dihydrate synthetic gypsum is a byproduct of flue gas desulfurization processes from power plants. Plaster of Paris is also known as calcined gypsum, stucco, calcium sulfate semihydrate, calcium sulfate half-hydrate or calcium sulfate hemihydrate. When it is mined, raw gypsum is found in the dihydrate form. In this form, there are approximately two water molecules of water associated with each molecule of calcium sulfate. In order to produce the hemihydrate form, the gypsum is calcined to drive off some of the water of hydration by the following reaction:

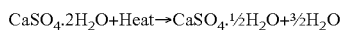
$$CaSO_4 \cdot 2H_2O + Heat \rightarrow CaSO_4 \cdot \tfrac{1}{2}H_2O + \tfrac{3}{2}H_2O$$

Calcium sulfate hemihydrate can produce at least two crystal forms. Alpha-calcined gypsum is made by a continuous process or a lump rock process whereby the calcium sulfate dihydrate is calcined under pressure. The alpha-calcined gypsum forms less acicular crystals than beta-calcined gypsum, allowing the crystals to pack tightly together, making a denser and stronger plaster. The crystal morphology allows water to flow easily between the crystals, requiring less water to form a flowable slurry. More elongated crystals are characteristic of the beta-calcined gypsum. This crystal structure results in a less dense product because the crystals are more loosely packed. The beta form also requires more water to fluidize the calcined gypsum. If the calcining of the dihydrate is performed at ambient pressure, the beta form is obtained and the cost is relatively low compared to the alpha-calcined gypsum.

A number of useful gypsum products can be made by mixing the calcium sulfate hemihydrate with water and shaping the resulting product slurry into the desired shape. The product slurry is permitted to set by allowing the calcium sulfate hemihydrate to react with sufficient water to convert the hemihydrate into a matrix of interlocking dihydrate crystals. As the gypsum matrix forms, the product slurry becomes firm and holds the desired shape. Excess water must then be removed from the product by drying.

Dihydrate gypsum is known for use as a soil conditioner. When added to the soil, it adds calcium, a mineral that is utilized by plants. It also breaks down soils that contain clays. The dense structure of clay delays establishment of new plants by making it difficult for the roots to penetrate the soil. Because of gypsum's ability to provide soil nutrients, spray matrices using gypsum have been tried with limited success in sandy soils.

Erosion-control matrices are known in the marketplace that are gypsum-based. They are spray-applied to the soil with traditional hydraulic seeding equipment. One product, marketed as AIRTROL® Geobinder (USG Corp., Chicago, Ill.) is a pure slurry of calcined gypsum in water. A second product, ENVIRO-SHIELD® Bonded Fiber Matrix (USG Corp., Chicago, Ill.) includes mulch and a polymer in the gypsum slurry. These products retain clay soils while awaiting development of a root system from vegetation; however, these products are not adequately effective in preventing erosion of sandy soils.

SUMMARY OF THE INVENTION

A dry mixture for use with water has been developed to be used as an erosion control spray matrix for reducing erosion of sandy soils while awaiting development of a root system of plants to hold the soil in place. The dry erosion control mixture includes alpha-calcined calcium sulfate hemihydrate, a non-gypsum binder polymer, biodegradable fibers; and wood fiber mulch.

Some embodiments of the dry mixture include a water-insoluble, cross-linking polymer. Other embodiments include a defoamer. The dry mixture is used to make an erosion control slurry when combined with water.

The erosion control slurry is applied to an area of soil in need of erosion-control. After obtaining the dry erosion control mixture, it is mixed with water to form erosion control slurry. The ratio of the composition to the water is preferably from about 1:8 to about 1:12. Seed is distributed over the soil and the erosion control slurry is applied over the distributed seed.

This composition has been found to retain seed and reduce erosion in sandy soils better than other gypsum-based erosion-control systems. Fibers included in the erosion-control slurry reinforce the matrix when applied to a sandy soil, giving it better retention until the young plants develop sufficiently to hold the soil themselves.

DETAILED DESCRIPTION OF THE INVENTION

A composition is described for use with water to be used as an erosion-control spray matrix. A composition, product and method of the present invention form a spray matrix. Unless otherwise noted, amounts expressed as percentages are weight percents based on the total weight of the dry components.

The composition is a dry mixture of ingredients that, when combined with water, form a slurry. Primary components of the composition are calcium sulfate hemihydrate, fibers and a wood fiber mulch. Optional components include, but are not limited to dyes, calcium sulfate dihydrate, a second fiber and a polymer. Preferably, the composition is packaged in 50 pound bags for transport to the job site.

This composition utilizes alpha-calcined calcium sulfate hemihydrate. Alpha-calcined calcium sulfate hemihydrate is calcined under pressure to form a less acicular particle than other forms. It is characterized by higher strength and forming a slurry of increased flowability. Amounts of alpha-calcined calcium sulfate include 30% to about 50% by weight alpha-calcined calcium sulfate hemihydrate based on the total weight of the dry components. In some embodiments, the amount of alpha-calcined calcium sulfate is from about 40% to about 45% by weight alpha-calcined calcium sulfate hemihydrate based on the weight of the dry components. An example of a preferred alpha-calcined calcium sulfate hemihydrate is HYDROCAL® C-Base calcined gypsum.

A small amount of non-gypsum binder is included in the erosion-control composition. It helps to hold the slurry together, particularly on sloped areas, between the time the slurry is applied to the land and the time the calcined gypsum sets. In some embodiments, the binder is used in amounts of about 1% to about 2%. An example of a suitable binder is a redispersible ethylene and vinyl acetate copolymer, such as ELOTEX 50E200 Polymer manufactured by National Starch and Chemical of Bridgewater, N.J.

Fibers are included in the composition. In some embodiments, primary fibers are made of a biodegradable polymeric material. At least one embodiment utilizes a photodegradable polymer that degrades when exposed to the UV rays contained in sunlight. As the composition is deposited on the surface of the soil, sunlight is readily available to aid in decomposition of the fibers. For the purpose of this invention, biodegradable materials are defined as those that breakdown in the soil in about one year or less. Photodegradable plastics are thermoplastic synthetic polymers into which have been incorporated light-sensitive chemical additives or copolymers for the purposes of weakening the bonds of the polymer in the presence of ultraviolet radiation. Photodegradable plastics are designed to become weak and brittle when exposed to sunlight for prolonged periods. Photosensitizers used include diketones, ferrocene derivatives (aminoalkyferrocene) and carbonyl-containing species. These plastics degrade in a two-stage process, with UV light initially breaking some bonds leaving more brittle lower molecular weight compounds that can further degrade from physical stresses such as wave action or scarification on rocks. An example of a photodegradable plastic is a light-sensitive polypropylene manufactured by Propex Operating Company, L.L.C. of Chattanooga, Tenn.

Size of the primary fibers is also an important consideration. Long fibers are preferred over short fibers. As used herein, "length" is defined as the maximum dimension of the primary fiber. The primary fibers should be at least 0.25 inches (6 mm) in length. Maximum primary fiber length is limited only by the ability to spray it from a nozzle. In some embodiments, the primary fiber length does not exceed 1.5 inches (38 mm), however, with the appropriate spraying equipment, fibers longer than 1.5 inches are optionally useful. Primary fibers in other embodiments range from about 0.5 to about 1.0 inches in length.

Optional use of more than one fiber is contemplated. Where a primary and a secondary fiber are used, they can be two biodegradable polymers, two photodegradable polymers or a combination of a biodegradable polymer and a photodegradable polymer. One example of a secondary fiber is a siliconized polyethylene fiber such as KURLON fibers manufactured by Kurlon, Ltd. of Bangalore, India.

Another major component of the composition is a wood fiber mulch. Either hard wood fibers, soft wood fibers or a combination of both fibers may be used. The mulch preferably includes primarily hard wood fibers. In some embodiments 100% hard wood fibers are used. Little or no bark is included in the mulch. Wood fibers that are included in the composition are between 0.25 inch to 1.5 inches (6-38 mm) in the largest dimension. In some embodiments, the mulch includes no fibers that float.

Calcium sulfate dihydrate, or gypsum, is an optional component of this invention. It is used in addition to calcium sulfate hemihydrate, but is not used as a substitute for the alpha-hemihydrate. Although any form of calcium sulfate dihydrate can be used, the calcium sulfate dihydrate used in some embodiments is in the form of landplaster or terra alba.

A water-insoluble, cross-linking polymer is optionally added as a humectant. Polymers that are insoluble in the aqueous slurry and that cross-link have sufficient strength to withstand exposure to weather long enough to establish young plants. In some embodiments, the cross-linking polymer is a cellulosic polymer. An example of an effective humectant is ZEBA superabsorbent polymer by Absorbent Technologies, Inc. of Beaverton, Oreg. This polymer is a starch-based hydrogel that absorbs large amounts of water, releasing it as needed by the seedlings. Water-insoluble, cross-linking polymer is used in amounts of about 0.05 to about 2% based on the weight of the dry components.

When the erosion control slurry is applied using hydraulic equipment, it is advantageous to include one or more defoamers to reduce air entrainment. The defoamer is added in any effective amount. Some embodiments utilize defoamers in amounts of about 1 to about 2 pounds per ton of dry components. Use of two or more different defoamers is contemplated. An example of a useful defoamer is FOAMASTER CN, by Geo Specialty Chemicals of Lafayette, Ind.

Another optional component is a dye. The dye can be used to give the matrix an aesthetically pleasing appearance until it degrades and becomes part of the soil. Green dye, for example, gives the matrix the appearance of grass or other vegetation. Once the plant life emerges and the matrix begins to degrade, portions of the matrix that remain are less conspicuous among the new growth.

Some alpha-hemihydrate compositions are premixed for other uses. In many cases, these compositions are advantageous as sources of the alpha-hemihydrate. One such example is TUFSTONE® brand Gypsum Cement. In addition to the alpha-hemihydrate, this product includes fibers and a small amount of a binder polymer. When TUFSTONE Gypsum Cement is utilized, it supplies the alpha-calcined hemihydrate, the non-gypsum binder polymer and the secondary fibers.

In selecting any of the components to prepare an erosion control matrix, effects of each of the ingredients on the environment should be considered. As the matrix degrades slowly under the effects of weather, the ingredients are deposited in the soil. Use of ingredients that are detrimental to the soil or water table is discouraged.

It is convenient to provide all of the components above in dry form. They are then combined in a dry mixture that can be packaged in this form. At the site where the erosion control product is to be applied, the dry mixture is added to water, then stirred or mechanically agitated to combine. The amount of water is at least enough to form a sprayable slurry. In some embodiments, the amount of water is from about 50 to about 100 gallons, based on 50 pounds of the dry components. More preferably, the amount of water is from about 50 to about 70 gallons per 50 pound bag of dry components. Water used should be as pure as practical to reduce side reactions which can change the strength or the set time of the hydration reactions. Potable water is preferred in most embodiments.

Any additive is useful in the erosion-control slurry that does not interfere with the gypsum hydration reactions but would assist in growth of the desired vegetation. For the purposes of this invention, an additive "interferes" with hydration if the set time of the erosion-control slurry is accelerated to be less than the time needed to mix and apply the slurry or is retarded to be greater than eight hours. Fertilizer may be added in amounts of about 1 to about 10% by weight based on the total weight of the dry components. Additives that control the growth of competing vegetation, such as invasive species, can also be added to the slurry.

Prior to applying the slurry, the soil subject to the erosion control treatment is prepared. Erosion-prone areas usually requiring treatment are newly graded and seeded portions of land. Sandy soils are more easily eroded compared to clay soils. Areas in the vicinity of commercial construction of roads, buildings and the like, have usually been stripped of vegetation and graded for drainage, often including sloped or non-sloped areas. Large grassy areas, such as golf courses, are also candidates for this treatment. The erosion-prone soil is preferably graded and prepared to receive seed. The soil is then seeded with grasses, ground covers or other plant seeds appropriate to the climate using any one of a variety of seeding techniques. Seeding is conveniently accomplished with a hydraulic seeding or similar equipment that sprays an aqueous seed slurry having solids up to ½ inch in the largest dimension. In addition to seeds for the desired vegetation, the seeding mixture optionally includes mulch, fertilizer, tackifying agents, dye or additives to prevent germination of undesired species. Optionally, tanks and pumps for hydraulic seeding are carried by a truck, with a helicopter or airplane being used for very large areas. However, no vehicle is necessary for application of the seed slurry. Conventional techniques for seeding may also be employed, such as broadcasting or using a tractor towed seed planter.

After the seed has been laid down, the erosion-control slurry is applied. In most cases, the same hydrotreating equipment used for seeding may be used to apply the erosion control slurry. However, the use of any equipment that is capable of distributing a slurry that includes particles of the size described above is contemplated. By way of example, the erosion-control slurry is pumped or spray-applied onto the soil at a rate of about 2000 to about 5000 pounds per acre based on the weight of the combined dry ingredients. In some embodiments the application rate is about 3500 to about 4500 pounds per acre on the same basis. It is recommended that the erosion-control slurry be applied at a time when it is not likely to be washed away by rain prior to setting of the calcium sulfate hemihydrate.

As the hydration reactions proceed, the slurry sets to become a hard, protective covering over the seed. The gypsum-based seed covering breaks down naturally under the effects of weather, adding calcium and other additives slowly to the soil. Gypsum acts as a natural soil conditioner, particularly in clay soils. There is an advantage as the nutrients are released over time, so that the young plants are not inundated with high doses of chemicals as soon as they emerge from the seed pod.

EXAMPLE 1

A slope of "sandy loam" soil was prepared measuring 3 feet by 60 feet. The slope had a 3:1 rise, meaning that it was on a 30° angle.

An erosion-control composition was prepared according to Table I for application to the slope. Dry ingredients were combined to form a dry mixture. At the time of application, the composition was blended with 50 gallons of water per 50 pounds of dry mixture to form a slurry and sprayed onto the slope. The slurry was applied at the rate of 3800 to 4500 pounds per acre.

TABLE I

Composition of Erosion-Control Matrix

| Component | Amount |
|---|---|
| TUFSTONE Gypsum Cement | 48% |
| Polypropylene Fibers | 2% |
| Wood Fiber Mulch | 48% |
| Dye | 2% |

TUFSTONE® Gypsum Cement is a product designed for solid castings. In addition to C-Base alpha-calcined gypsum, it contains 1.5% by weight Elotex 50E 200 (FL2210) binding polymer and 0.1% by weight Kurlon fibers having a length of less than ¼ inch (<6 mm).

Results of the Rainfall Sediment tests are shown in Table II. This test conducted using an indoor rain simulator whereby rain was applied for 30 minutes at a rate of 3.5 inches per hour.

TABLE II

Rainfall Sediment Test

| | Wet Soil Loss, lbs. (Kg) | | | Average Soil Moisture, % | | | Dry Soil Loss, lbs. (Kg) | | |
|---|---|---|---|---|---|---|---|---|---|
| | 1$^{st}$ 10 minutes | 2$^{nd}$ 10 minutes | 3$^{rd}$ 10 minutes | 1$^{st}$ 10 minutes | 2$^{nd}$ 10 minutes | 3$^{rd}$ 10 minutes | 1$^{st}$ 10 minutes | 2$^{nd}$ 10 minutes | 3$^{rd}$ 10 minutes |
| Round 1 | | | | | | | | | |
| Test A | 0.0(0.0) | 5.5(2.5) | 8.5(3.9) | 0.0 | 99.37 | 98.92 | 0.0(0.0) | 0.0(0.0) | 0.1(0.05) |
| Test B | 6.5(3.0) | 10.5(4.8) | 13.0(5.9) | 99.31 | 57.90 | 27.98 | 0.0(0.0) | 4.4(2.0) | 9.4(4.3) |
| Test C | 10.0(4.5) | 67.5(30.7) | 235.0(107) | 57.93 | 22.99 | 24.53 | 4.2(1.9) | 52.0(23.6) | 177.4(81) |
| Total | 16.5(7.5) | 83.5(38.0) | 256.5(117) | — | — | — | 4.3(1.9) | 56.4(25.6) | 186.8(85) |
| Total Dry Soil Loss for Round 1: 247.5 lbs. or 137.5 lbs. per 100 ft$^2$ | | | | | | | | | |
| Round 2 | | | | | | | | | |
| Test A | 0.0(0.0) | 3.0(1.4) | 6.0(2.7) | 0.0 | 100.0 | 99.88 | 0.0(0.0) | 0.0(0.0) | 0.0(0.0) |
| Test B | 4.5(2.0) | 9.0(4.1) | 89.0(40.5) | 99.89 | 99.32 | 24.33 | 0.0(0.0) | 0.1(0.05) | 67.3(30.6) |
| Test C | 8.5(3.9) | 18.0(8.2) | 298.0(135) | 59.68 | 23.33 | 22.65 | 3.4(1.5) | 13.8(6.3) | 230(105) |
| Total | 13.0(5.9) | 30.0(13.6) | 393.0(179) | — | — | — | 3.4(1.5) | 13.9(6.3) | 298(135) |
| Total Dry Soil Loss for Round 2: 315.1 lbs. or 175.05 lbs. per 100 ft$^2$ | | | | | | | | | |
| Round 3 | | | | | | | | | |
| Test A | 0.0(0.0) | 5.0(2.3) | 6.5(3.0) | 0.0 | 199.62 | 99.19 | 0.0(0.0) | 0.0(0.0) | 0.1(0.05) |
| Test B | 6.0(2.7) | 10.0(4.5) | 88.0(40) | 98.96 | 51.67 | 24.07 | 0.1(0.05) | 4.8(2.2) | 65.8(31.1) |
| Test C | 26.5(12) | 294(133) | 1014(461) | 22.65 | 24.92 | 24.07 | 20.5(9.3) | 220(100) | 770(350) |
| Total | 32.5(15) | 308.5(140) | 1109(504) | — | — | — | 20.6(9.3) | 225(103) | 836(380) |

Total Dry Soil Loss for Round 3: 1081.9 lbs. or 601.05 lbs. per 100 ft$^2$

Over the test period, the total dry soil loss was 1644.5 pounds of soil. The erosion-control matrix performed well on two of the three test rounds, producing a soil loss significantly below the allowed threshold loss of 284.3 pounds per 100 ft$^2$ or less.

At the time these tests were carried out at the Texas Transportation Institute, germination testing was unavailable. Subsequent germination tests at an alternate facility rated germination two weeks after seeding as "very good."

EXAMPLE 2

Three test beds 14 inches×12 inches×1½ inches (35.6 cm×30.5 cm×3.8 cm) were prepared with a growing medium. Each of the three beds was used twice, for a total of six tests. The medium was known as "loamy sand" developed and supplied by the Texas Transportation Institute for erosion testing.

A water-insoluble, cross-linking cellulosic polymer, ZEBA superabsorbent polymer, was added to the composition of Table 1 in amounts ranging from 0.05% to 0.125% based on the weight of the dry ingredients. The dry components were combined then mixed with water in amounts of one gallon of water per one pound of dry components. The resulting slurry was applied by hand at a coating rate of 3800 to 4000 pounds per acre and allowed to set and dry in an outdoor environment.

A spray apparatus was designed to simulate rainfall. Rainfall was applied to the beds for a period of thirty minutes. At the end of the thirty minutes, observations were made as to the degree of erosion loss. In all tests, minimal erosion was observed. It was also noted that the matrix "filtered" the water, allowing it to flow down the slope while still holding the slope in place.

EXAMPLE 3

Comparative Example

ENVIRO-SHIELD Bonded Fiber Matrix by USG Corp., Chicago, Ill. was tested at the Texas Transportation Institute for Sediment Loss and Vegetation Density in both clay and sandy soils. Test results are shown in Table III. Sediment values are expressed as "pounds per 10 ft$^2$." The Sediment Standard is a maximum while the Vegetation Density standard is a minimum value.

TABLE III

Testing of ENVIROSHIELD

| | Clay | | Sand | |
|---|---|---|---|---|
| | Sediment | Veg. Density | Sediment | Veg. Density |
| 3:1 or Flatter | | | | |
| Standards | 7.95 | 40% | 284.32 | 10% |
| ENVIROSHIELD | 7.88 | 41.13% | 391.95 | 5.88% |
| Steeper than 3:1 | | | | |
| Standards | 7.89 | 40% | 631.8 | 10% |
| ENVIROSHIELD | 6.74 | 43.51% | 798.24 | 8.16% |

As can be seen from Table III, ENVIROSHIELD successfully passed the performance standards for use with clay soils, but failed to do so with sandy soils.

While particular embodiments of the erosion-control matrix and application thereof have been shown and described, it will be appreciated by those skilled in the art that changes and modifications may be made thereto without departing from the invention in its broader aspects and as set forth in the following claims.

What is claimed is:
1. A composition for use with water to be used as an erosion control spray matrix, said composition comprising:
   alpha-calcined calcium sulfate hemihydrate;
   a non-gypsum, redispersible polymeric binder;
   biodegradable primary fibers; and
   wood fiber mulch.

2. The composition of claim 1 wherein said primary fibers have a length of about 0.25 inches (6 mm) to about 1.5 inches (38 mm).

3. The composition of claim 1 further comprising a water-insoluble, cross-linking polymer that acts as a humectant in amounts of about 0.05 to about 2% based on the weight of the dry components.

4. The composition of claim 3 wherein said water-insoluble, cross-linking polymer comprises a starch-based hydrogel.

5. The composition of claim 1 wherein said primary fibers comprise polypropylene.

6. The composition of claim 1 further comprising calcium sulfate dihydrate.

7. The composition of claim 6 wherein said calcium sulfate dihydrate is obtained from landplaster or terra alba.

8. The composition of claim 1 further comprising a secondary fiber.

9. The composition of claim 8 wherein said secondary fiber is a siliconized polyethylene fiber.

10. The composition of claim 1 further comprising a defoamer.

11. The composition of claim 1 wherein said polymeric binder is an ethylene and vinyl acetate copolymer.

12. The composition of claim 1 further comprising a dye.

13. A slurry for use as an erosion-control spray matrix comprising the composition of claim 1 and water, wherein the ratio of said composition to said water is from about 1:8 to about 1:12 by weight.

14. The slurry of claim 13 further comprising one component selected from the group consisting of calcium sulfate dihydrate, a dye, a defoamer, a water-insoluble, cross-linking polymer and mixtures thereof.

15. A composition for use with water to be used as an erosion control spray matrix, said composition comprising:
   calcium sulfate dihydrate;
   alpha-calcined calcium sulfate hemihydrate;
   a non-gypsum polymeric binder;
   biodegradable primary fibers; and
   wood fiber mulch.

16. The composition of claim 15 wherein said calcium sulfate dihydrate is obtained from landplaster or terra alba.

* * * * *

UNITED STATES PATENT AND TRADEMARK OFFICE
CERTIFICATE OF CORRECTION

| | | |
|---|---|---|
| PATENT NO. | : 8,349,919 B2 | Page 1 of 1 |
| APPLICATION NO. | : 12/846435 | |
| DATED | : January 8, 2013 | |
| INVENTOR(S) | : Breen | |

It is certified that error appears in the above-identified patent and that said Letters Patent is hereby corrected as shown below:

In the Specification:

In Column 2, Lines 14-15 of the issued patent; the equation should read

--$CaSO_4 \cdot 2H_2O + \text{Heat} \rightarrow CaSO_4 \cdot 1/2H_2O + 3/2H_2O$--.

In Columns 7 and 8 of the issue patent, "Table II", "Round 3," "Test A," fifth column; delete "199.62" and replace with --99.62--.

Signed and Sealed this
First Day of July, 2014

Michelle K. Lee
*Deputy Director of the United States Patent and Trademark Office*